(12) United States Patent
Aharon

(10) Patent No.: US 9,169,597 B2
(45) Date of Patent: Oct. 27, 2015

(54) METHOD OF RECYCLING FIBERS FROM SEWAGE SLUDGE AND MEANS THEREOF

(75) Inventor: Refael Aharon, Modi'in-Maccabim-Re'ut (IL)

(73) Assignee: Applied Cleantech Inc., Newton, MA (US)

( * ) Notice: Subject to any disclaimer, the term of this patent is extended or adjusted under 35 U.S.C. 154(b) by 1045 days.

(21) Appl. No.: 11/886,101

(22) PCT Filed: Mar. 9, 2006

(86) PCT No.: PCT/IL2006/000314
§ 371 (c)(1),
(2), (4) Date: Apr. 15, 2008

(87) PCT Pub. No.: WO2006/095389
PCT Pub. Date: Sep. 14, 2006

(65) Prior Publication Data
US 2009/0281302 A1    Nov. 12, 2009

(30) Foreign Application Priority Data
Mar. 10, 2005    (IL) .......................................... 167363

(51) Int. Cl.
| | | |
|---|---|---|
| *C08B 1/00* | (2006.01) | |
| *A61K 31/717* | (2006.01) | |
| *D21C 5/02* | (2006.01) | |
| *C02F 9/00* | (2006.01) | |
| *D21B 1/02* | (2006.01) | |
| *D21B 1/32* | (2006.01) | |
| *C02F 1/48* | (2006.01) | |
| *C02F 1/72* | (2006.01) | |
| *C02F 1/76* | (2006.01) | |
| *C02F 11/12* | (2006.01) | |
| *D21C 9/10* | (2006.01) | |

(52) U.S. Cl.
CPC ... *D21C 5/02* (2013.01); *C02F 9/00* (2013.01); *D21B 1/026* (2013.01); *D21B 1/32* (2013.01); *C02F 1/488* (2013.01); *C02F 1/72* (2013.01); *C02F 1/76* (2013.01); *C02F 11/12* (2013.01); *C02F 11/121* (2013.01); *D21C 9/10* (2013.01); *Y02W 30/646* (2015.05); *Y02W 30/648* (2015.05)

(58) Field of Classification Search
CPC ........ A61K 31/717; C08B 37/14; C08B 1/00; C02F 9/00; C02F 1/488; C02F 1/72; C02F 1/76; C02F 11/121; C02F 11/12; D21B 1/26; D21C 9/10
USPC .......................... 536/56, 127, 124; 514/57, 54
See application file for complete search history.

(56) References Cited

U.S. PATENT DOCUMENTS

| | | | |
|---|---|---|---|
| 3,579,320 A | | 5/1971 | Presses |
| 3,670,968 A | | 6/1972 | Galeano |
| 3,680,796 A | | 8/1972 | Galeano |
| 3,711,392 A | | 1/1973 | Metzger |
| 3,814,336 A | | 6/1974 | Brewer |
| 3,849,246 A | | 11/1974 | Raymond et al. |
| 3,897,301 A | * | 7/1975 | Bauman et al. ............... 162/189 |
| 3,909,397 A | | 9/1975 | Aldinger |
| 3,911,808 A | | 10/1975 | Lassiter et al. |
| 3,933,577 A | | 1/1976 | Penque |
| 4,185,680 A | | 1/1980 | Lawson |
| 4,219,381 A | | 8/1980 | Schnell |
| 4,279,741 A | | 7/1981 | Campbell |
| 4,405,450 A | | 9/1983 | Selder |
| 4,427,541 A | | 1/1984 | Crosby et al. |
| 4,440,635 A | | 4/1984 | Reiniger |
| 4,486,459 A | | 12/1984 | Thompson |
| 4,545,900 A | | 10/1985 | Wright |
| 4,570,861 A | | 2/1986 | Zentgraf et al. |
| 4,846,975 A | | 7/1989 | Kelyman |
| 4,849,116 A | | 7/1989 | Weinmann et al. |
| 4,874,134 A | | 10/1989 | Wiens |
| 4,895,642 A | | 1/1990 | Frei |
| 4,974,781 A | | 12/1990 | Placzek |
| 5,024,335 A | | 6/1991 | Lundell |
| 5,100,066 A | | 3/1992 | Frei |
| 5,292,075 A | | 3/1994 | Bartlett |
| 5,297,742 A | | 3/1994 | Grunditz et al. |

(Continued)

FOREIGN PATENT DOCUMENTS

| | | |
|---|---|---|
| CA | 2095979 | 9/1994 |
| DE | 4121104 A1 | 10/1992 |

(Continued)

OTHER PUBLICATIONS

Kataoka et al., JP 63315197 A; Dec. 22, 1988 (abstract sent).*

(Continued)

*Primary Examiner* — Shaojia Anna Jiang
*Assistant Examiner* — Michael C Henry
(74) *Attorney, Agent, or Firm* — Mintz Levin Cohn Ferris Glovsky and Popeo, P.C.

(57) ABSTRACT

The present invention generally relates to a method of recycling and producing fibers from sewage sludge, such as streams of municipal, agricultural and industrial flowing wastes to be further processed. The present invention also relates to industrial means adapted for recycling the same. The present invention discloses environmentally friendly processes and means for recovering valuable fibers and especially cellulose fibers and the like from agricultural and/or urban sewage sludge, waste and/or industrial effluents to decrease its volume especially BOD and TSS, obtaining valuable raw materials and decreasing environmental damages.

16 Claims, 3 Drawing Sheets

(56) References Cited

U.S. PATENT DOCUMENTS

| | | | |
|---|---|---|---|
| 5,571,703 A | 11/1996 | Chieffalo et al. | |
| 5,968,362 A * | 10/1999 | Russo, Jr. | 210/635 |
| 6,048,458 A | 4/2000 | Vogt et al. | |
| 6,207,015 B1 | 3/2001 | Templer et al. | |
| 6,238,516 B1 | 5/2001 | Watson et al. | |
| 6,244,446 B1 | 6/2001 | Schmittel | |
| 6,250,472 B1 | 6/2001 | Grubbs et al. | |
| 6,336,992 B1 | 1/2002 | Blomquist | |
| 6,379,527 B1 | 4/2002 | Vogt et al. | |
| 2002/0060014 A1 | 5/2002 | Sipila et al. | |
| 2002/0157989 A1* | 10/2002 | Gatlin et al. | 208/226 |
| 2003/0141225 A1 | 7/2003 | Liddle et al. | |
| 2004/0035959 A1 | 2/2004 | Hautala | |
| 2004/0182793 A1* | 9/2004 | Owens | 210/759 |
| 2004/0209753 A1 | 10/2004 | Kikushima et al. | |
| 2007/0098625 A1 | 5/2007 | Adams et al. | |
| 2007/0108406 A1 | 5/2007 | Schu | |
| 2007/0175825 A1 | 8/2007 | Denney | |
| 2010/0196981 A1 | 8/2010 | Aharon et al. | |

FOREIGN PATENT DOCUMENTS

| | | |
|---|---|---|
| DE | 10135678 A1 | 2/2003 |
| DE | 10150753 A1 | 7/2003 |
| EP | 0170301 A2 | 2/1986 |
| EP | 0658648 A2 | 6/1995 |
| EP | 0969076 A1 | 1/2000 |
| FR | 2780320 A1 | 12/1999 |
| GB | 264128 A | 5/1927 |
| GB | 275717 A | 8/1927 |
| GB | 444993 A | 4/1936 |
| GB | 457756 A | 12/1936 |
| GB | 601963 A | 5/1948 |
| GB | 704765 A | 3/1954 |
| GB | 741987 A | 12/1955 |
| GB | 748580 A | 5/1956 |
| GB | 912450 A | 12/1962 |
| GB | 985097 A | 3/1965 |
| GB | 1029001 A | 5/1966 |
| GB | 1416273 A | 12/1975 |
| GB | 1445698 A | 8/1976 |
| GB | 1477326 A | 6/1977 |
| GB | 1498706 A | 1/1978 |
| GB | 1502985 A | 3/1978 |
| GB | 1528236 A | 10/1978 |
| GB | 2172525 A | 9/1986 |
| JP | 6331515197 A * | 12/1988 |
| JP | 04-215811 | 8/1992 |
| JP | 04215811 A | 8/1992 |
| JP | 06-039368 | 2/1994 |
| JP | 06-269746 | 9/1994 |
| JP | 11-116368 | 4/1999 |
| JP | 11-158789 | 6/1999 |
| JP | 200483127 A | 10/2004 |
| WO | WO-9114504 A1 | 10/1991 |
| WO | WO-9612569 A1 | 5/1996 |
| WO | WO-9720643 A2 | 6/1997 |
| WO | WO-0072987 A1 | 12/2000 |
| WO | WO-0189730 A2 | 11/2001 |
| WO | WO-0234420 A2 | 5/2002 |
| WO | WO-2004003289 A1 | 1/2004 |
| WO | WO-2004108609 A1 | 12/2004 |
| WO | WO-2005113458 A1 | 12/2005 |
| WO | WO-2008073186 A2 | 6/2008 |

OTHER PUBLICATIONS

Cheung et al. "Laboratory Investigation of Ethanol Production From Municipal Primary Wastewater Solids." *Biores. Tech.* 59(1997):81-86.

* cited by examiner

METHOD OF RECYCLING FIBERS FROM SEWAGE SLUDGE AND MEANS THEREOF

RELATED APPLICATIONS

This application is a national stage application, filed under 35 U.S.C. §371, of International Application No. PCT/IL2006/000314, filed on Mar. 9, 2006 which claims the benefit of Israel Serial Number 167363, filed Mar. 10, 2005.

FIELD OF THE INVENTION

The present invention generally relates to a method of recycling and producing fibers from sewage sludge, such as streams of municipal, agricultural and industrial flowing wastes to be further processed. The present invention also relates to industrial means adapted for recycling the same. More specifically, the present invention relates to Sewerage especially designed for the recycling and producing fibers from sewage sludge.

BACKGROUND OF THE INVENTION

Cellulose is a complex carbohydrate consisting of thousands of glucose units in a linear chain structure. This polysaccharide is pack into fibers. Hemicelluloses, such as xylans, uronic acid and arabinose are complex carbohydrates that, with other carbohydrates (e.g., pectins), surround the cellulose fibers of plant cells.

Those valuable materials, as other fibrous materials, are currently consisted as a significant ingredient of urban sewage sludge. Reference is made to table 1, presenting cellulose and hemicellulose content, as was sampled and analyzed (triplet test) in Israeli municipal sludge before processing. Crude sludge comprising about 11% (dry weight) cellulose fibers and 14% hemicellulose, wherein dry dense sludge comprising 10% hemicellulose and 2% cellulose. Before digestion the dry dense sludge comprising similar contents. Screening crude sludge by a means of 50 mesh comprising almost equal content of hemicellulose and cellulose (i.e., about 7%). By screening the same in a 130 mesh screens, 12% hemicellulose and 15% cellulose content is obtained.

The sources of sewage fibers are selected from toilet paper; non-digest fruit and vegetable fibers (i.e., new fibers); and cotton, synthetic fibers etc provided from cloths and laundry.

In spite of the fact that the fibers are comprised as a cost effective portion of the municipal effluents, those fibers are traditionally wasted, i.e., burned, digested, disposed or disposed as an effluent towards the sea, or the rivers, causing environment problems else ware. Moreover, today, sewage sludge is massively concealed in the ground and hence regarded as one a main environmental problem. So far no one has recycled or produced organic fibers from these sources.

Few attempts for treating fibers (especially paper and paper products) have been made. Hence, US patent application 2003/0141225 to Liddle et al. discloses a method and system for separating and sorting recyclable materials from mixed waste streams. This system comprising a low surface current bath adapted to separate materials having differential wet densities. U.S. Pat. No. 3,670,968 to Galeano discloses a system and process for recovering the cellulosic fibrous material containing municipal refuse, and converting it into reusable pulp. Nevertheless, a cost-effective industrial-oriented recycling process of sewage sludge's fibers thus meets a long felt need and focuses to target environmental acute problems.

SUMMARY OF THE INVENTION

The present invention discloses environmentally friendly processes and means for recovering valuable fibers and especially cellulose fibers and the like from agricultural and/or urban sewage sludge, waste and/or industrial effluents to decrease its volume especially BOD and TSS, obtaining valuable raw materials and decreasing environmental damages.

Moreover, a cost effective and novel process for sewerage treatment is hereby disclosed. This process is especially adapted for the recycling and producing cellulose fibers from sewage sludge. These fibers can be used in the paper, textile and food industries.

It is thus in the scope of the present invention wherein a novel method of recycling and/or producing fibers from sewage sludge. This method comprising: removing ironware magnetically and/or applying initial crude separation; separating fibers from the remaining sludge and waters; chemically oxidizing the same; sorting fibers to their various types; bleaching the same by using active oxygen or chlorine-containing agents; and then, dewatering, and packaging the resulted fibers.

BRIEF DESCRIPTION OF THE FIGURES

In order to understand the invention and to see how it may be implemented in practice, embodiments will now be described, by way of non-limiting example only, with reference to the accompanying drawing, in which.

DETAILED DESCRIPTION OF THE PREFERRED EMBODIMENTS

The following description is provided, alongside all chapters of the present invention, so as to enable any person skilled in the art to make use of said invention and sets forth the best modes contemplated by the inventor of carrying out this invention. These invention demonstrate the sequence of actions and the principles that will provide fiber separation from the remaining sewage material. Various modifications, however, will remain apparent to those skilled in the art, since the generic principles of the present invention have been defined specifically to provide means and methods of recycling fibers obtained in sewage sludge.

It is according to one embodiment of the present invention wherein the process is adapted to treat sewerage, or any other effluents whereat human, agricultural and industrial sewage are incorporated.

Figure 1:
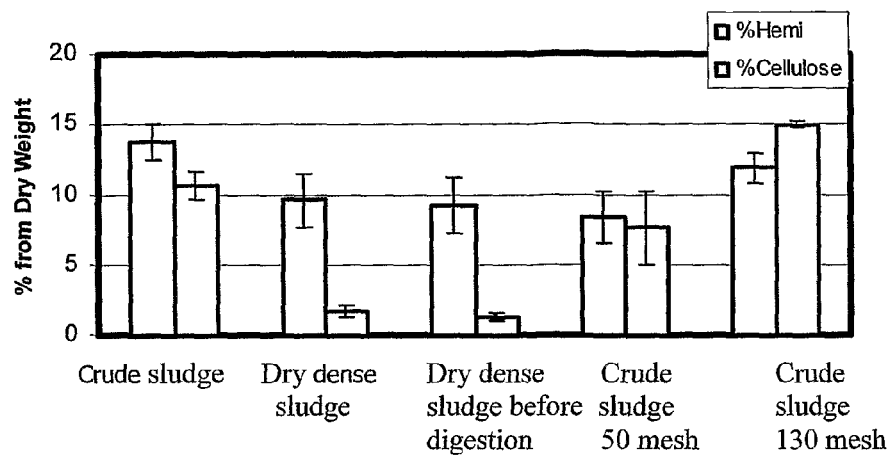
FIG. 1 is a table that describes cellulose and hemi cellulose content in sewage sludge as was sampled in municipal liquid waste of Haifa (IL) sewerage; and, FIG. 2 schematically describes a process for treating sewerage such that reusable fibers are obtained.
Figure 2:
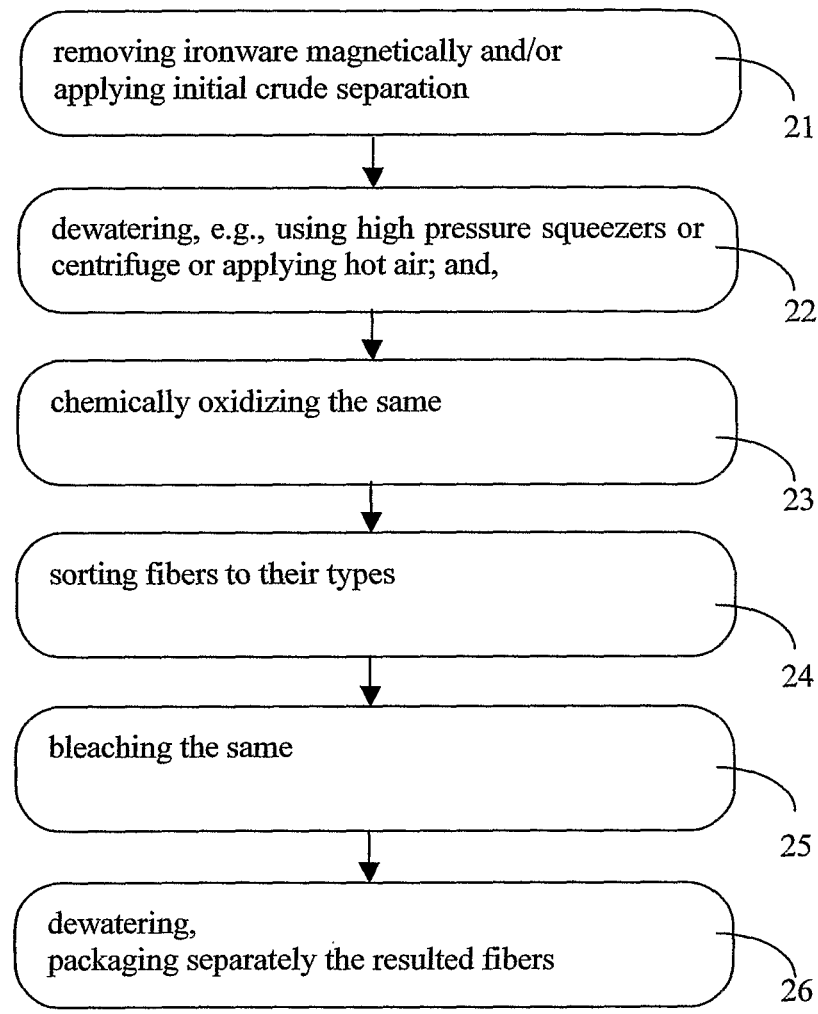

Reference is made now to FIG. 2 presenting said process, comprising inter alia to the following steps: step I removing ironware magnetically and/or applying initial crude separation (21); step II separating the total fibers from the remaining sludge and water (22); step III chemically oxidizing the same, e.g., by means of formic or citric acids; and/or by utilizing sodium, sulfur, potassium or phosphate-containing compositions such as sterilized and/or degraded remaining organic solids are obtained (23); step IV sorting fibers to their types, e.g., separating out long, short, synthetic etc. fibers such as separate types are obtained; this sorting step is potentially yet not exclusively provided by applying a plurality of vertical screens and pipe screens, using vibration and/or sonically movement (24); bleaching the same by using active oxygen or chlorine-containing agents (25); and then, dewatering, e.g., using high pressure squeezers or centrifuge or applying hot air; and, packaging separately the resulted fibers (26).

Steps I and II are performed on the sewerage pipeline. Steps III and IV may be performed either next to every main sewerage pipeline or in a centric location.

The preferred location to perform the method is, either on the sewerage pipeline before the WWTP (Waste Water Treatment Plant) at the entrance to the WWTP, at the primary sedimentation catchrnents or before the digestion process.

The method is potentially provided wherein the chemically oxidizing step is applied by means of formic or citric acids and/or by utilizing sodium, sulfur, potassium or phosphate-containing compositions. It is preferably, yet not exclusively, also comprising a step or steps of separating the fibers from the rest in the solid portion of the sewage sludge; and/or step or steps of sterilizing and bleaching the obtained fiber. The method may also comprising applying of an effective measure of carboxylate-containing compositions comprising inter alia at least one of the group of citric acid, iso-citric acid, fumaric acid, oxalic acid, malic or maleic acids, its derivatices or any mixture thereof.

It is according to yet another embodiment of the present invention wherein the method defined above preferably comprising screening solids thereout; oxidizing soluble remains; sorting the fibers obtained thereof; bleaching said fibers; processing the same in a plurality of downstream processes selected from pressing, dewatering and packaging the resulted fibers such that reusable fibers are provided.

The term 'sludge' generally refers hereinafter municipal flowing waste, to streams of municipal flowing wastes to be further processed and to any liquid or semi-liquid messy substance pre-processed or processed waste, and in a non-limiting manner, also to town refuses, wastes, urbane industrial or agricultural effluents, downstream processes, slurries comprising fibers. The term sludge is further denoted hereunder to effluents comprising toilet paper; non-digest fruit and vegetable fibers (i.e., new fibers); and cotton, synthetic fibers etc provided from cloths and laundry. This term also refers to dry sludge that was previously concealed in the ground.

The term 'sewage sludge' refers herein below to sewage, sewerage, or any other effluents whereat human, industrial and agricultural sewage are incorporated.

The term 'fibers' generally refers hereinafter in a non-limiting manner to any organic, synthetic of partially processed filament, and especially to fibers selected from a group comprising inter alia pulp or other polysaccharides, cellulose- and/or hemi-cellulose-containing materials, cotton fibers, fibers comprised in a vegetative matter, paper and paper products, wood products, diapers, toilet paper or any mixture thereof. The term 'fibers' is additionally refereeing hereinafter to fibers mixed in sewage sludge.

It is according to one embodiment of the present invention wherein method of recycling fibers obtained in sludge is disclosed, wherein the sludge is provided by a means of a continuous flux having a predetermined volume. Said flux is preferably provided in a mass-production means, such as utilizing conveyor belt or snail conveyor, forcing liquids or other flowing materials via conduits and pipes. Additionally or alternatively, the sludge is processed batchwise. It is according to another embodiment of the present invention wherein the sludge is provided in a flowing state, e.g., a liquid state; bulky state e.g., granular or coarse solid state or a combination thereof.

It is in the scope of the present invention wherein the screening and floating process or processes are provided by utilizing a plurality of meshes, wherein the terms 'mesh' and 'screen' refer hereinafter to one or more mesh, net grating or screen, preferably wherein said meshes arrange in series. Hence, a series of screens are possibly applied. This series consists of a plurality of screens having essentially square vertical, horizontal and pipe like apertures; each screen in the series comprising successively smaller apertures than those of the previous one. As an example, a first screen is characterized as about 25 meshes and last screen is of about 180 meshes.

It is also in the scope of the present invention wherein the screening process or processes are provided inter alia by applying mechanical processing means: utilizing hydrocyclon, centrifuge, centrifugal floatation units, selective floating means and especially salt containing media, trammels and inclined trammels.

Moreover, the mechanical processing means are potentially selected from a group comprising cutting, slicing, incising, intersecting, sectioning, shearing, abscising, bisecting; articulating the bulky sludge so as small particles are obtained.

It is also in the scope of the present invention wherein the screening process or processes are provided by applying high-pressure fluid jets, high-pressure air steams, chemicals or any other crushing device. Those processes are adapted to break apart sludge matter into small particles. Hence, and the size of the particles are reduced by forcing them to pass throughout one or more screens. For example, the pressure of the water or air used for initial physical breaking apart of the fiber containing matter is ranging between about 15 and 1500 atmospheres. The apertures of the screens are preferably square or vertical or horizontal or circles and ranging between 1 and 200 mesh. It is in the scope of the present invention wherein a series of screens is provided. This screening module comprises a plurality of screens having essentially square apertures of about 15 mesh, 30 meshes, 45 meshes etc.

It is according to one embodiment of the present invention wherein the screening is provided inter alia by applying effective maneuver and/or vibration on the screening means so as the screens are vibrated, oscillated, pulsated, trembled, resonated; rotated or stirred thereof.

It is according to one embodiment of the present invention wherein the screening is provided inter alia by applying chemical and/or biological processing or separating steps. Hence, a combination of chemical and biological processes is provided useful be fermenting sludge matter so as a delignified matter is obtained. For example, the chemical and/or biological steps are potentially selected from conditioning the vegetative matter; mechanically breaking apart of the bulky sludge matter by applying high pressure fluid jets; forcing it to pass throughout one or more screens in a series; biologically fermenting the same by a means of microbial inoculum such as an effective delignification is provided.

It is according to one embodiment of the present invention wherein the downstream processes are selected from cleaning, sorting of fibers by diameter, type and/or length, aligning, pressing the obtained fibers into bales, and drying the same.

It is according to one embodiment of the present invention wherein the bleaching is provided by a means of oxygen containing compositions, e.g., active oxygen, oxygen gas, hydrogen peroxide, super oxide radical, ozone, bleaching oxides; halogenated compositions, such as chlorates, perchlorates, hypoperchlorates, sodium or calcium or sulfur hypoperclorates, bleaching chlorides or any mixture thereof. A concentration range of about 20% to 80% is useful for many systems.

It is according to one embodiment of the present invention wherein effective measure of formate-containing compositions is applied. Those compositions are preferably, yet not exclusively comprised of at least one of the group of formic acid, calcium formate, potassium formate, magnesium formate, ammonium formate and/or liquid formats, ethyl formate, methyl formate, butyl format acetic-formic solutions or any mixture thereof. Hence for example, formate-containing compositions is potentially applied in a concentration range of 0.1 to about 80% v/v.

It is according to one embodiment of the present invention when Steps I and II are performed on the sewerage pipeline. Steps III and IV may be performed either next to every main sewerage pipeline or in a centric location.

The preferred location to perform the method is, either on the sewerage pipe-line before the WWTP (Waste Water Treatment Plant) at the entrance to the WWTP, at the primary sedimentation catchments or before the digestion process.

Figure 3:
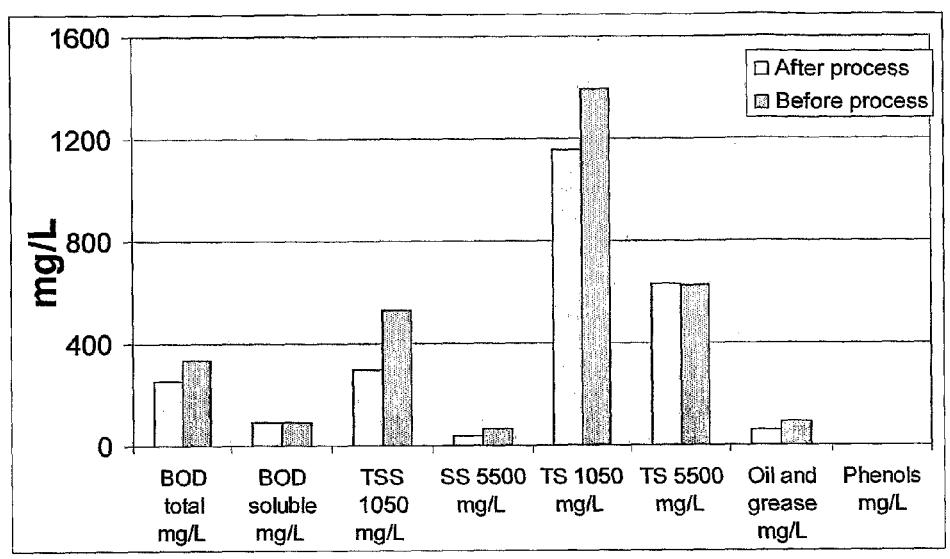
FIG. 3 is a table that describes the parameters sewage is composed of, before and after use of the process introduced in present invention.

Another object of the present invention is, when using the present invention, the two main parameters sewage is composed of—BOD and TSS—are reduced by 30%. All other parameters remain almost intact. (see FIG. 3)

Another object of the present invention is to present a cost effective system adapted to recycle fibers from sludge. This environmental friendly system is comprised of separating and processing means adapted for screening solids there out; means for oxidizing soluble remains; means for sorting the fibers obtained thereof; means for bleaching said fibers; means for processing the same in a plurality of downstream processes selected from pressing, dewatering and packaging the resulted fibers such that reusable fibers are provided. A recycling system adapted to recycle fibers from sludge utilizing the methods defined above is further disclosed. Moreover, new fibers (e.g., undigested matter) and recycled fiber provided by the recycled system as defined above is also disclosed. The previously mentioned system is especially adapted to produce fibers from industrial or human sewage sludge or from sewerage and from industrial origin. This system is either incorporated with sewage sludge systems or treating sewage in an independent manner.

The invention claimed is:

1. A method for producing a cellulose and hemicellulose fiber composition from sewage sludge comprising:
    removing, based on a determination that ironware is present in said sewage, said ironware from said sewage sludge;
    applying initial crude separation for screening a solid portion of said sewage sludge;
    removing a cellulose and hemicellulose fiber portion from said solid portion;
    oxidizing said cellulose and hemicellulose fiber portion; and
    producing said cellulose and hemicellulose fiber composition;
    wherein the method for producing the cellulose and hemicellulose fiber composition further comprises:
        bleaching said cellulose and hemicellulose fiber portion;
        dewatering said cellulose and hemicellulose fiber portion;
        sterilizing said cellulose and hemicellulose fiber portion;
        sorting said cellulose and hemicellulose fiber portion according to fiber type; and
        packaging said reusable cellulose and hemicellulose fiber composition;
    wherein at least one of the removing the ironware, the applying, the removing the cellulose and hemicellulose, the oxidizing, and the producing is performed at a Waste Water Treatment Plant (WWTP).

2. The method according to claim 1, wherein said oxidizing is applied by formic acid, citric acid, a sodium containing composition, a sulfur containing composition, a potassium containing composition, a phosphate containing composition, or any combination thereof.

3. The method according to claim 1, further comprising applying a formate containing composition, a formic acid containing composition, a calcium formate containing composition, a potassium formate containing composition, a magnesium formate containing composition, an ammonium formate containing composition, a liquid formate containing composition, an ethyl formate containing composition, a methyl formate containing composition, a butyl formate containing composition, an acetic-formic solution or any combination thereof.

4. The method according to claim 1, further comprising applying a carboxylate-containing composition, a citric acid containing composition, an iso-citric acid containing composition, a fumaric acid containing composition, an oxalic acid containing composition, a malic acid containing composition, a maleic acid containing composition or any combination thereof.

5. The method according to claim 1, wherein said screening is performed by utilizing a mesh, a series of meshes, a net grating or a screen.

6. The method according to claim 1, further comprising applying mechanical processing.

7. The method according to claim 6, wherein said mechanical processing comprises utilizing a hydrocyclon, a centrifuge, a centrifugal floatation unit, a salt-containing media, a trammel or an inclined trammel.

8. The method according to claim 1, further comprising breaking apart said cellulose and hemicellulose fiber portion.

9. The method according to claim 1, wherein said bleaching is performed by an oxygen containing composition, an active oxygen containing composition, an oxygen gas containing composition, a hydrogen peroxide containing composition, a super oxide radical containing composition, an ozone containing composition, a bleaching oxide containing composition, a halogenated composition, a chlorate composition, a perchlorate composition, a sodium containing composition, a calcium containing composition, a sulfur containing composition, a bleaching chloride composition or any combination thereof.

10. The method of claim 1, wherein said method is operative to reduce:
    a total soluble solid (TSS) content of said sewage sludge by 30%; and
    a biochemical oxygen demand (BOD) content of said sewage sludge by 30%.

11. The method of claim 1, wherein the removing of said cellulose and hemicellulose fiber portion from said solid portion is performed before digestion of said sewage sludge within the waste water treatment plant.

12. The method of claim 1, wherein the sewage sludge further comprises industrial, municipal or agricultural flowing wastes.

13. The method according to claim 1, wherein said removing ironware comprises removing ironware magnetically.

14. The method according to any one of the preceding claims, wherein the sewage sludge comprises human waste.

15. A method for producing a cellulose and hemicellulose fiber composition from sewage sludge comprising:
    applying initial crude separation for screening a solid portion of said sewage sludge;
    removing a cellulose and hemicellulose fiber portion from said solid portion;

oxidizing said cellulose and hemicellulose fiber portion; and producing said cellulose and hemicellulose fiber composition;

wherein the method for producing the cellulose and hemicellulose fiber composition further comprises:

bleaching said cellulose and hemicellulose fiber portion;

dewatering said cellulose and hemicellulose fiber portion;

sterilizing said cellulose and hemicellulose fiber portion;

sorting said cellulose and hemicellulose fiber portion according to fiber type; and packaging said reusable cellulose and hemicellulose fiber composition;

wherein at least one of the applying, the removing, the oxidizing, and the producing is performed at a Waste Water Treatment Plant (WWTP).

16. A method for producing a cellulose and hemicellulose fiber composition from sewage sludge comprising:

applying initial crude separation for screening a solid portion of said sewage sludge;

removing a cellulose and hemicellulose fiber portion from said solid portion;

oxidizing said cellulose and hemicellulose fiber portion; and producing said cellulose and hemicellulose fiber composition;

wherein the method for producing the cellulose and hemicellulose fiber composition further comprises:

bleaching said cellulose and hemicellulose fiber portion;

dewatering said cellulose and hemicellulose fiber portion;

sterilizing said cellulose and hemicellulose fiber portion;

sorting said cellulose and hemicellulose fiber portion according to fiber type; and packaging said reusable cellulose and hemicellulose fiber composition;

wherein at least one of the applying, the removing, the oxidizing, and the producing is performed at a Waste Water Treatment Plant (WWTP), and wherein the sewage comprises human waste.

* * * * *